(12) United States Patent
Mauthofer et al.

(10) Patent No.: US 10,763,064 B2
(45) Date of Patent: Sep. 1, 2020

(54) ELECTRIC FUSE BOX OR JUNCTION BOX ASSEMBLY WITH A HIGH VOLTAGE ELECTRIC LINE CUTTER DEVICE

(71) Applicant: Key Safety Systems, Inc., Sterling Heights, MI (US)

(72) Inventors: Alois Mauthofer, Alzenau (DE); Martin Pieruch, Hochheim (DE); Matthias Volkmann, Kronberg (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 16/217,182

(22) Filed: Dec. 12, 2018

(65) Prior Publication Data
US 2020/0194202 A1    Jun. 18, 2020

(51) Int. Cl.
| | | |
|---|---|---|
| *H01H 39/00* | (2006.01) | |
| *H01H 71/02* | (2006.01) | |
| *H01H 50/54* | (2006.01) | |
| *B23D 15/14* | (2006.01) | |
| *H01H 11/00* | (2006.01) | |
| *B60L 3/04* | (2006.01) | |
| *H02B 1/20* | (2006.01) | |

(52) U.S. Cl.
CPC .......... *H01H 39/006* (2013.01); *B23D 15/14* (2013.01); *B60L 3/04* (2013.01); *H01H 11/00* (2013.01); *H01H 50/546* (2013.01); *H01H 71/02* (2013.01); *H01H 71/025* (2013.01); *H02B 1/20* (2013.01); *H01H 2039/008* (2013.01)

(58) Field of Classification Search
CPC .... H01H 39/006; H01H 71/025; H01H 11/00; H01H 71/02; H01H 50/546; H01H 2039/008; B60L 3/04; H02B 1/20; B23D 15/14
USPC .................................................. 337/157, 401
See application file for complete search history.

(56) References Cited

U.S. PATENT DOCUMENTS

| | | | | |
|---|---|---|---|---|
| 3,003,045 | A | * 10/1961 | Tichenor .................. | H01H 3/00 200/296 |
| 3,277,255 | A | 10/1966 | Mattsson et al. | |

(Continued)

FOREIGN PATENT DOCUMENTS

| | | |
|---|---|---|
| CN | 104698972 | 6/2015 |
| DE | 102015204028 | 9/2015 |
| JP | 2002512422 | 4/2002 |

*Primary Examiner* — Anatoly Vortman
(74) *Attorney, Agent, or Firm* — Meunier Carlin & Curfman LLC

(57) ABSTRACT

An electric fuse box or junction box assembly has a high voltage electric line cutter assembly inside an electric fuse box or junction box. The assembly has a box housing for connecting a plurality of electrical lines or connections to a power source. The housing has a pair of mounting stanchions for affixing the high voltage electric line cutter assembly with an electric current carrying busbar having a pair of stub ends. Each stub end of the busbar for carrying electric current from the power source to the plurality of electrical lines is secured to one of the mounting stanchions. Each mounting stanchion has an attachment platform for attaching and supporting the stub end of the busbar and an underlying chamber below the attachment platform for receiving exhaust gases generated when the high voltage electric line cutter assembly is activated.

18 Claims, 16 Drawing Sheets

(56) References Cited

U.S. PATENT DOCUMENTS

| | | | | |
|---|---|---|---|---|
| 3,393,605 A * | 7/1968 | Parnell | B63G 7/02 | |
| | | | 30/180 | |
| 3,848,100 A * | 11/1974 | Kozorezov | H01H 39/006 | |
| | | | 200/61.08 | |
| 3,873,786 A * | 3/1975 | Lagofun | B23D 15/145 | |
| | | | 200/61.08 | |
| 4,224,487 A | 9/1980 | Simonsen | | |
| 4,417,519 A * | 11/1983 | Lutz | H01H 39/004 | |
| | | | 102/263 | |
| 5,535,842 A | 7/1996 | Richter et al. | | |
| 5,877,563 A * | 3/1999 | Krappel | H01H 39/006 | |
| | | | 180/271 | |
| 6,194,988 B1 * | 2/2001 | Yamaguchi | H01H 39/006 | |
| | | | 180/279 | |
| 6,222,439 B1 * | 4/2001 | Tanigawa | H01H 39/006 | |
| | | | 180/279 | |
| 6,232,568 B1 * | 5/2001 | Hasegawa | H01H 39/006 | |
| | | | 200/61.08 | |
| 6,295,930 B1 * | 10/2001 | Kume | H01H 39/006 | |
| | | | 102/202.5 | |
| 6,411,190 B1 * | 6/2002 | Yamaguchi | H01H 39/00 | |
| | | | 180/279 | |
| 6,556,119 B1 | 4/2003 | Lell | | |
| 6,843,157 B2 | 1/2005 | Hamilton et al. | | |
| 6,934,164 B2 * | 8/2005 | Higuchi | H01H 85/044 | |
| | | | 361/752 | |
| 7,078,635 B2 * | 7/2006 | Kordel | H01H 39/006 | |
| | | | 200/61.08 | |
| 7,123,124 B2 * | 10/2006 | Caruso | H01H 39/006 | |
| | | | 337/157 | |
| 7,205,879 B2 * | 4/2007 | Kordel | H01H 39/006 | |
| | | | 337/157 | |
| 7,222,561 B2 | 5/2007 | Brede et al. | | |
| 7,239,225 B2 * | 7/2007 | Tirmizi | H01H 39/006 | |
| | | | 337/157 | |
| 7,511,600 B2 * | 3/2009 | Von Behr | H01H 39/006 | |
| | | | 200/61.08 | |
| 8,653,386 B2 | 2/2014 | Ukon et al. | | |
| 9,153,402 B2 | 10/2015 | Ukon et al. | | |
| 9,221,343 B2 * | 12/2015 | Tokarz | B60L 3/0046 | |
| 9,236,208 B2 * | 1/2016 | Ukon | H01H 39/006 | |
| 9,324,522 B2 | 4/2016 | Nakmura et al. | | |
| 9,419,424 B2 * | 8/2016 | Karnbach | H02G 5/025 | |
| 2004/0221638 A1 * | 11/2004 | Brede | B23D 15/145 | |
| | | | 72/326 | |
| 2010/0218659 A1 * | 9/2010 | Ukon | H01H 39/006 | |
| | | | 83/639.1 | |
| 2013/0056344 A1 * | 3/2013 | Borg | H01H 39/00 | |
| | | | 200/81 R | |
| 2013/0263715 A1 | 10/2013 | Ukon et al. | | |
| 2014/0118887 A1 * | 5/2014 | Deb | H02B 13/025 | |
| | | | 361/622 | |
| 2015/0116911 A1 * | 4/2015 | Sharma | H02B 1/565 | |
| | | | 361/605 | |
| 2015/0305181 A1 * | 10/2015 | Kurita | H05K 7/026 | |
| | | | 361/679.01 | |
| 2016/0190777 A1 * | 6/2016 | Faber | H02B 1/565 | |
| | | | 361/641 | |
| 2017/0263403 A1 * | 9/2017 | Marlin | H01H 39/006 | |
| 2017/0323747 A1 * | 11/2017 | Burger | H01H 39/006 | |
| 2018/0034013 A1 * | 2/2018 | Jeong | H01M 2/04 | |

\* cited by examiner

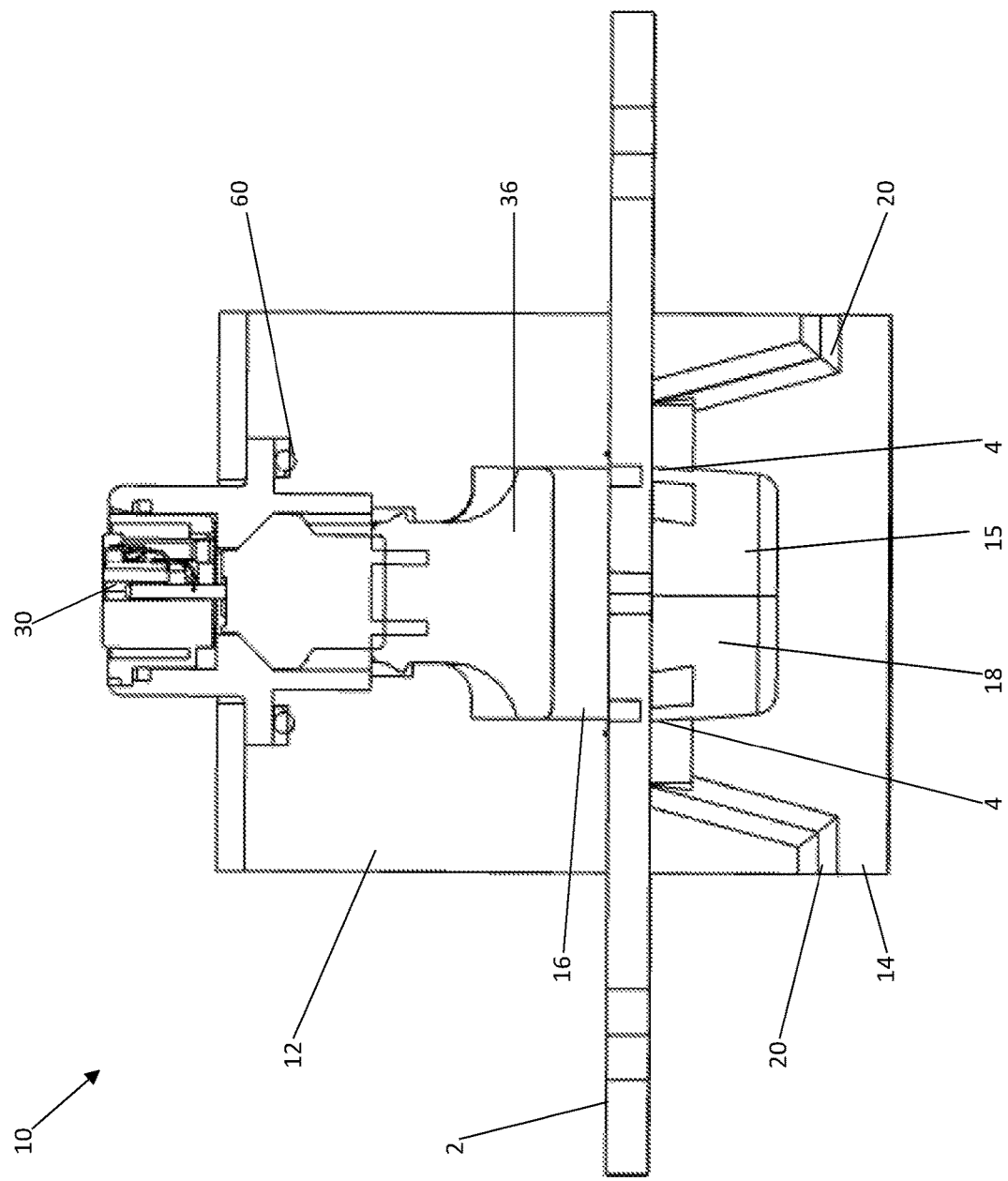

ELECTRIC FUSE BOX OR JUNCTION BOX ASSEMBLY WITH A HIGH VOLTAGE ELECTRIC LINE CUTTER DEVICE

FIELD OF THE INVENTION

The present invention relates to an electric fuse box or junction box assembly, respectively, with a device for extremely rapid termination of very high voltages and currents. More particularly, a device that upon a sensed signal can disrupt current flow in milliseconds. The device is particularly useful in vehicle crashes, more particularly, electric vehicle crashes. In general, the device also allows for protection from damages and risks by short cuts of high voltage batteries where the device can also be used for stationary batteries, not only for batteries in electric vehicles.

BACKGROUND OF THE INVENTION

The use of hybrid and fully electric powered vehicles means a bank of batteries carrying very high voltages is required. In the event of a vehicle crash, the electrical current flowing from the batteries can become a serious hazard particularly as the current flows can be shorted to electrify a vehicle chassis with very high voltage. This creates a hazard for the occupants as well as emergency personnel responding to the accident. The possibility of electrocution or of the combustion of flammable material is an extreme risk. Ideally, the risk can be minimized if the flow of electricity can be disrupted, preferably near the source or in the case of electric vehicles, near the batteries.

A manual off switch is unreliable for many reasons, because the driver may be incapacitated and emergency personnel may not be able to safely access such a switch.

An object of the present invention is to have the disruption of high voltage electrical currents to occur automatically in the event of a crash and to do so in a very low cost and reliable way to protect the vehicle, its occupants and those emergency personnel responding to the accident.

The disconnection of the electrical currents has to happen in a really short time <2 ms, to avoid any damage of the connected electric system, for instance the onboard electronics of the vehicle. This invention simultaneously extinguishes the electrical arcs caused by a gas flow immediately after cutting the electrical connection while suppressing the heat generated by using the filters to cool and a piston to squeeze the electrical arcs between piston and cylinder.

In case of very high currents and voltages a higher volume of very hot and ionized gas can be produced during the disconnection. If the filtering volume is too small those hot gases can get out of the device, and the risk for an external re-ignition of the electric arc can increase.

Besides the functional requirements major design goals for a high voltage electric line cutter are low volume and low weight. As a consequence, the embedded filter volumes are minimized, they can be too small for very high currents and voltages with very hot and highly ionized gas. In such a case the hot gas streams have to be separated and cooled in order to avoid re-ignition. For this purpose, a further very important objective of the present invention is to modify and ingeniously mount the device inside an electric fuse box or junction box configured to safely receive and expel most debris and gases any electrical discharges at the fuse box or junction box.

SUMMARY OF THE INVENTION

The inventors envision the line cutter system or assembly should have a scalable and fully modular design. The main components are a Kernel and integrated or external shells with exhaust and filter function.

Kernel means the whole internal device including upper and lower housing, igniter, piston and busbar. It is needed for the basic cutting process of high voltage electric current and has to be designed for the highest required forces, voltages and currents. The distance busbar to coin and HV to LV metal parts for isolation coordination, the stability against mechanical forces for all voltages up to 1000V and 16000 A have to be taken into consideration in the design phase of the kernel. During the cutting process gas flow is created which needs to be guided by a gas channel system including piston and housing through the electric arc into the integrated first exhaust channel (i.e. the upmost gas channel below the busbar). The exhaust channels have to have adapters for the different shell modules.

Shell modules, i.e. exhaust-shell(s) and/or filter-shells are modules directly connected to the kernel. A family of specific shell modules can be developed for different vehicles and applications. The shell has to have pairs of chamber systems, each chamber system connected to one side of the kernel. Each chamber system can have one or more chambers. The gas flow of the two chamber systems has to be strictly separated to avoid reignition of the arc. The shell module can be combined directly with the kernel so that the resulting device becomes an integrated product to be mounted in a fuse box or junction box. The shell module can be external from the kernel, e.g. be part of the environment/fuse box/junction box. In this case the kernel needs a suitable interface to the external shell module.

A very simple version of the shell would be: no exhaust shell. That means, for lower voltages and currents the gas can be blown out from the integrated first exhaust channel in the kernel directly into the environment without the risk for reignition.

The next higher version would be a ceramic filter or a metal filter integrated in the first exhaust channel on both sides. For a fixation of the filter a filter plate can be mounted outside of the kernel.

An advanced version would be a dual stage filter with metal filter in the first filter stage for deionization and cooling and a ceramic fine filter in the second stage. This can be a filter pot around the lower housing. A reignition outside becomes less probable because of the de-ionisation and longer way out with cooling and filtering.

Further versions can have additional filter stages and larger volumes, thus the risk for reignition and the gas flow out can be minimized.

The shell modules, i.e. exhaust-shells/filter shells, can be outsourced to an external device by a very close docking of the kernel to the environment. If suitable external volumes are available those can be used for the exhaust and filter functions described above.

A very simple solution for an outsourced shell module would be a wall mounted very close around the kernel in the environment so that the gas flow out of the kernel on both sides is strictly separated.

Additional function modules can be added to the shell, even electronic modules for extended functionality.

The kernel can be part of all these solutions with no or only minor modifications.

A typical application is described in the following: An electric fuse box or junction box assembly has a high voltage electric line cutter assembly inside an electric junction box. The electric fuse box or junction box has a junction box housing for connecting a plurality of electrical lines or connections to a power source. The housing has a pair of mounting stanchions for affixing the high voltage electric line cutter assembly with an electric current carrying busbar having a pair of stub ends. Each stub end of the busbar for carrying electric current from the power source to the plurality of electrical lines is secured to one of the mounting stanchions. Each mounting stanchion has an attachment platform for attaching and supporting the stub end of the busbar and can have an underlying chamber below the attachment platform for receiving exhaust gases generated when the high voltage electric line cutter assembly is activated.

The electric junction box assembly also may include a pair of exhaust gas filters. One filter can optionally be stored in each underlying chamber to receive the exhaust gases. Each underlying chamber has an open end opposite the attachment platform. The high voltage electric line cutter has a pair of exhaust ports or passages and when attached to the stanchions, the exhaust ports align with an opening in each stanchion to receive exhaust gas inside the underlying chamber. The electric junction box assembly also has a cover to enclose the junction box housing.

The kernel of an electric line cutter device for high voltage busbars has a two-part housing, a piston, an igniter and a busbar. The first housing referred to as the upper housing includes a cylinder, cuboid or prism chamber. The second housing referred to as the lower housing also includes a cylinder, cuboid or a prism of any other polygonal shape chamber. The lower housing is affixed to the upper housing. The piston is contained inside one of either the upper housing chamber or the lower housing chamber. The igniter is for driving the piston from one chamber to the other chamber. The busbar is for carrying an electric current flow and is rigidly held between the upper and lower housing and spanning across said chambers. Upon igniting the igniter, the piston breaks a portion of the busbar moving the piston and the portion of the busbar into the opposite chamber thereby stopping the electric current flow. The piston is at least partially formed as an insulator to prevent electric discharge. The upper and lower housing are made at least partially, if not entirely, non-electrically conductive.

The upper and lower housing are removably attached to the other by one or more fasteners. The busbar is held rigidly by a compression force between the upper and lower housing on two opposed sides so the busbar, when broken, has the broken portion of the busbar move while the stub ends of the busbar remain rigidly held at the two opposed sides.

The busbar has the two stub ends extending external of the upper and lower housings. Each of the stub ends is configured to be attached to electrical wiring or cable to complete a circuit. The busbar further has a pair of fracture locations, each fracture location being internal and adjacent to the upper and lower housing chambers. Each fracture location is of a reduced thickness when viewed in a cross-section of the busbar. The fracture locations are configured to break upon an impact from the piston.

The igniter is electrically activated in the event of a signal from a sensor. In a preferred embodiment, the electric line cutter device is configured to be used in a vehicle capable of generating high voltages wherein the electric line cutter device is activated by the sensor in the event of a vehicle crash. The igniter preferably is a pyrotechnic device and further comprises a propellant charged squib. The upper or lower housing further has one or more blow-out vent passages extending from inside the chamber externally out through one of said upper or lower housings. The electric line cutter device preferably has a filter to capture debris generated during the breaking of the busbar and in particular to cool any hot gases and to deionize the plasma caused by electrical arcing. The filter is made of a high temperature resistant material, preferably, steel or woven steel.

Additionally to the kernel the electric line cutter device preferably has a filter, one per busbar stub side, to capture debris generated during the breaking of the busbar and in particular to cool down and deionize the plasma.

A smart integration of the high voltage electric line cutter kernel in the fuse box/junction box enables a functional integration of the filter outside the electric line cutter housing. For this purpose the needed expansion and filter volumes, i.e. the filter shell, can be outsourced to the environment, i.e. the hot gases getting out from the line cutter device are received and absorbed in neighbored auxiliary volume (s). These outsourced auxiliary volumes are functional extensions of the very small volumes inside the device and can be used for filtering and cooling the hot gases and especially for the separation of the two ionized gas streams.

The filter function can have one or more stages per side. The filter stages can be integrated in the electric line cutter housing and/or outside in neighbored auxiliary volumes. For example the first filter stage can be part of the electric line cutter housing and the second stage can be outsourced to the external auxiliary volume.

The said volumes can be filled with filter material, made of a high temperature resistant material, preferably metal like copper, steel, woven steel or ceramic material like super wool.

The auxiliary volumes can be two stanchions as described above but also separated open volumes inside the fuse box/junction box. In this case the gas flow coming out from the two gas exhausts has to be separated by an insulating wall.

The high voltage electric cutting performance becomes modular and scalable by optionally using external auxiliary volumes for the expansion and filtering of the hot gas. The cutting kernel with igniter, piston and housing can be designed for optimized cutting performance and stability and can be used for all applications. Depending on the required cutting performance, i.e. current, voltage and inductance, different energy is produced by the igniter and the electric arc. An appropriate filter solution can be used for each energy level, either with internal filters only, with combined internal and external filters, or only with filters in external auxiliary volumes. This saves installation space and costs.

BRIEF DESCRIPTION OF THE DRAWINGS

The invention will be described by way of example and with reference to the accompanying drawings in which:

FIG. 8 is a second cross-sectional view showing the busbar being rigidly held.

DETAILED DESCRIPTION OF THE INVENTION

Figure 1:
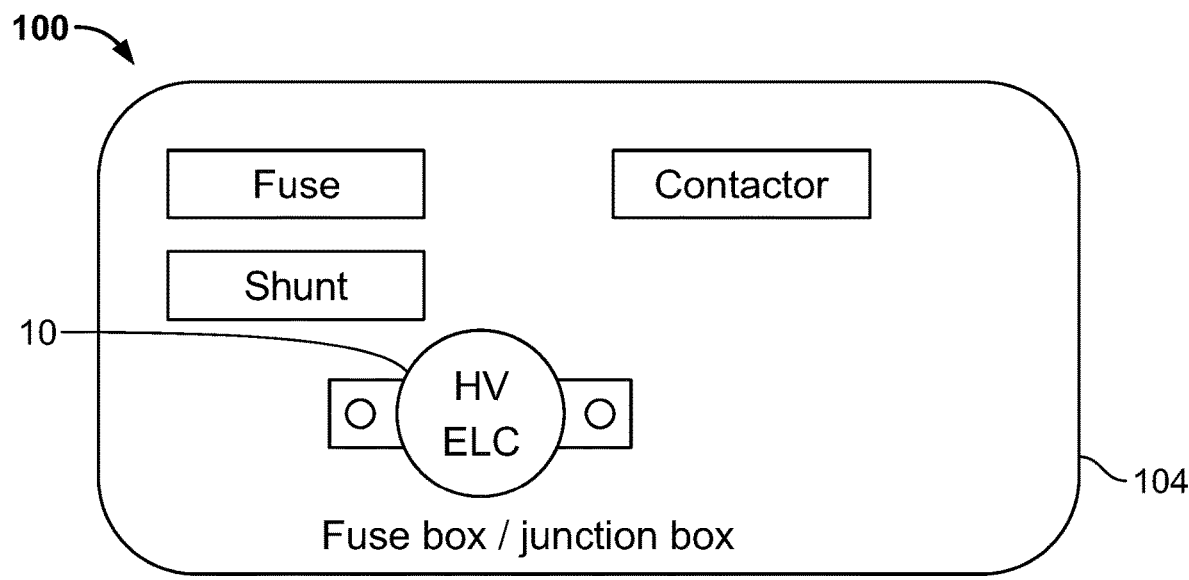
FIG. 1 is a top plan view of the fuse box/junction box housing, cover and electric line cutter device as an assembly.
Figure 2:
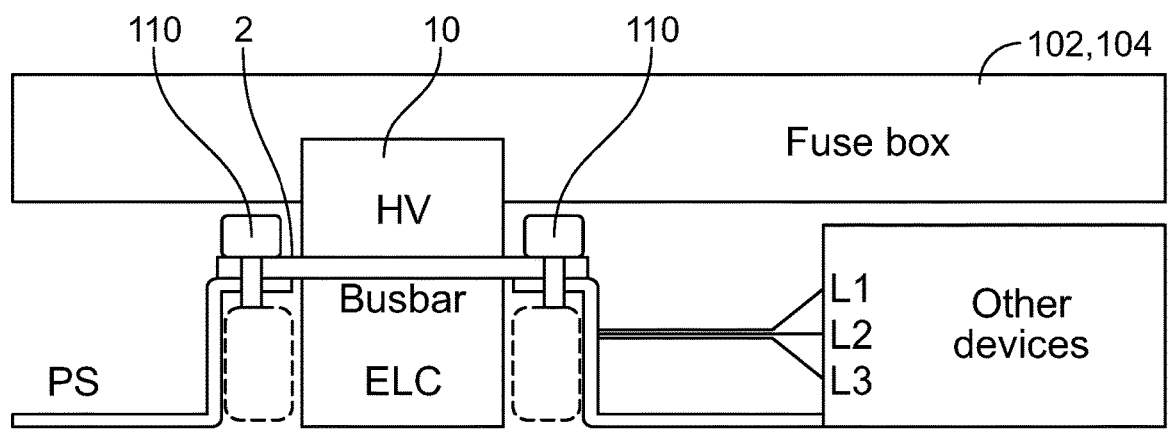
FIG. 2 is a side view of the junction box housing with the electric line cutter device taken from FIG. 1.
Figure 2A:
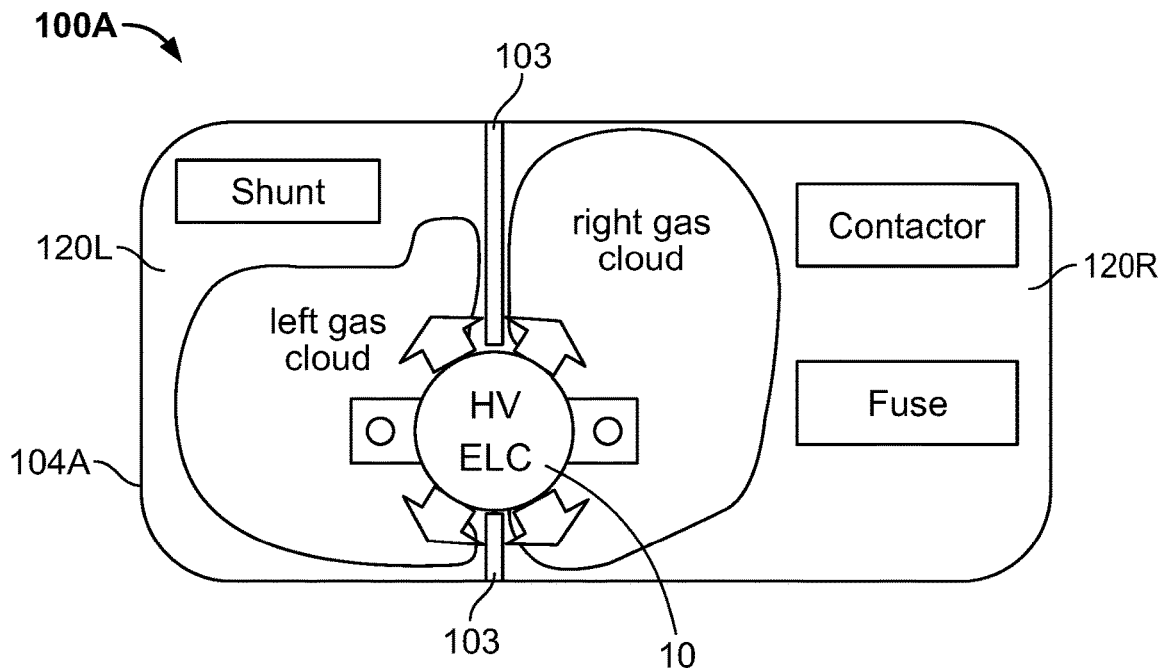
FIG. 2A is a top plan view of a second embodiment with insulating wall.

With reference to FIGS. 1 and 2, the electric junction box assembly 100 is illustrated. In FIG. 1, the upper portion is a junction box cover 102 that covers the junction box housing 104. Inside the junction box housing 104 is the high voltage electric line cutter assembly (HVELC) 10. In FIG. 2, the junction box cover 102 is removed showing the high voltage electric line cutter assembly 10 securely attached to the housing 104 by a pair of fasteners 110. On either side of the housing 104 are shown a line from a power source PS and a plurality of electrical connections or lines L1 L2 L3 such as a fuse, a shunt and a contactor commonly stored in the junction box assembly. FIG. 2A is an alternative embodiment junction box assembly 100A showing the line cutter device 10 and bulkhead walls 103 dividing the junction box housing 104A into a large left hollow chamber 120L and a large right hollow chamber 120R. This separates the gas cloud into left and right portions as shown when the line cutter device 10 is activated to cut the busbar.

Figure 3:
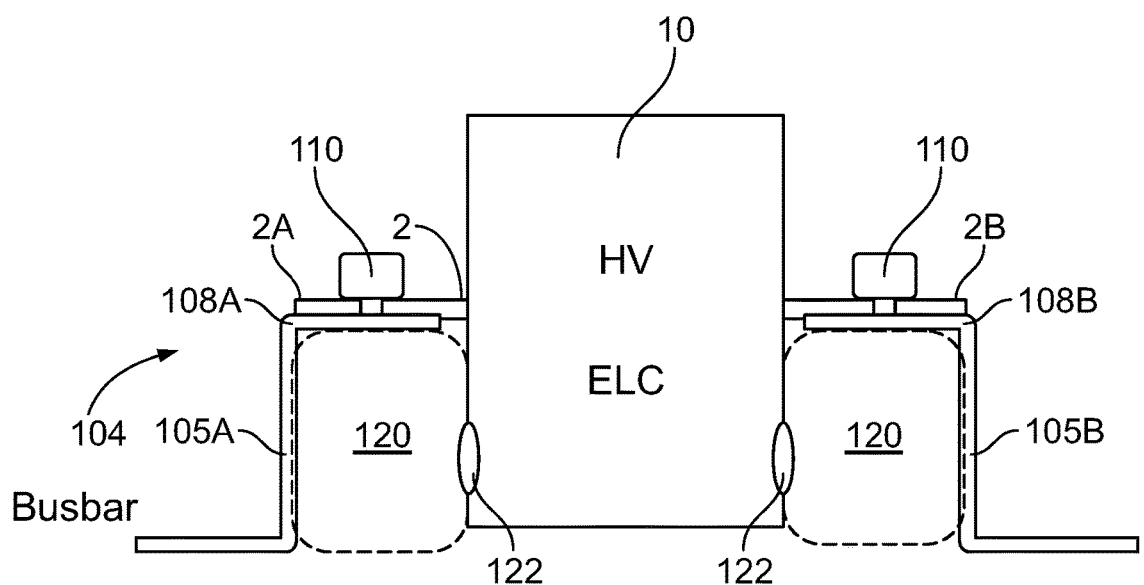
FIG. 3 is a cross sectional view of the line cutter device affixed to the stanchions of the junction box housing.

As better illustrated in FIG. 3, the junction box housing 104 with the electric line cutter assembly 10 is shown in cross section. A busbar 2 extends through the electric line cutter assembly 10 with a pair of stub ends 2A, 2B. Each stub end 2A, 2B as shown has an opening to receive the fastener 110. The high voltage electric current passes through this busbar 2 at line connections 108A, 108B shown underlying each of the stub ends of the busbar and resting directly on a platform of a stanchion 105A and 105B. The pair of stanchions 105A and 105B support and affix the high voltage line connections 108A, 108B and the stub ends 2A, 2B of the busbar 2 securing the high voltage line cutter assembly 10 to the junction box housing 104. Underlying the platforms of each of the stanchions 105A and 105B is an enlarged chamber 120. The stanchions 105A and 105B as shown are configured as hollow columns with an open end forming a bottom of the housing 104. This space or volume inside each stanchion 105A and 105B provides a large space to receive the discharge gases and debris when the busbar 2 is cut. To accomplish this exhaust passages in the cutter assembly 10 are aligned with holes or openings 122 in the stanchions 105A and 105B.

Figure 4:
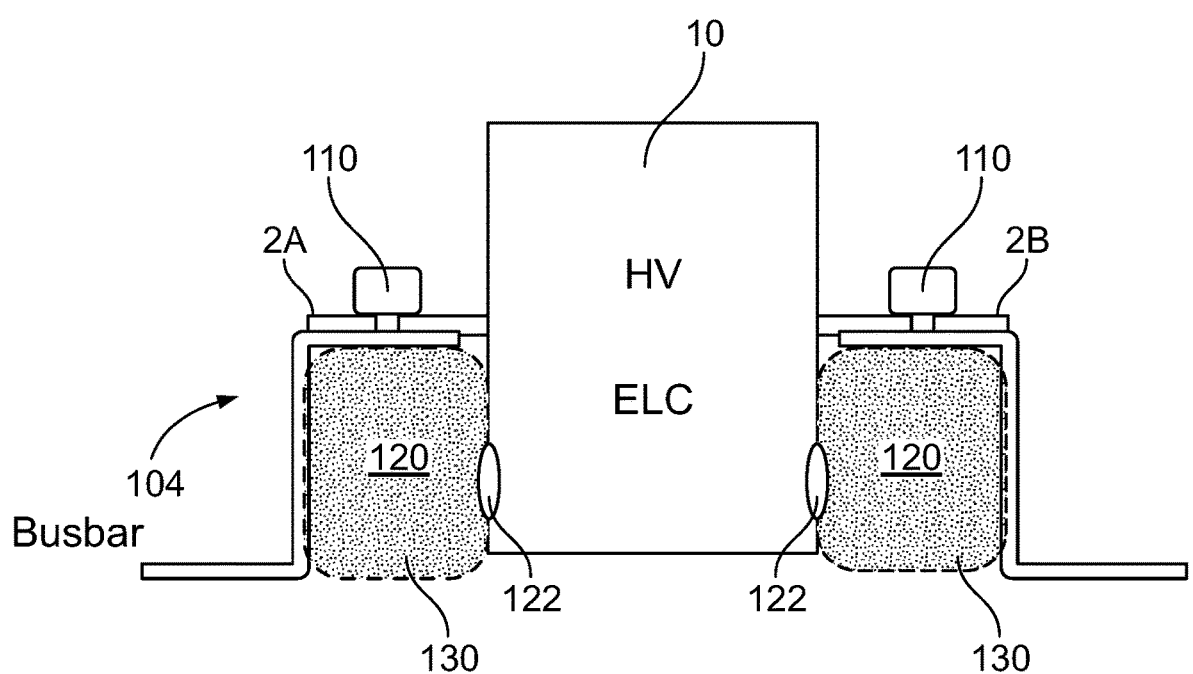
FIG. 4 is a cross-sectional view of the line cutter device affixed to the stanchions of the junction box housing with optional filters in the hollow space of the mounting base.

As shown in FIG. 4, the chamber 120 can be packed with filters 130 to capture debris.

During and after the cutting operation, ionized gas is produced by the HVELC igniter and the appearing electric arc. This gas finally leaves the electric line cutter after passing through a first filter. However, depending on the electric power of the battery system, the first filter may not cool or deionize enough the exhaust gases, which then could result in a re-ignition outside the cutter.

The present invention, instead of integrating a second filter into the HVELC, uses the available space in the chamber 120 inside the stanchions 105 to capture, filter and cool the hot gases from the electric line cutter 10. The space 120 under the busbar mounting platform is used as a filter room or at least as exhaust gas separation room. High voltage electric line cutters 10 usually create an electric flash during the event. To reduce the temperature as well as the hot gases most of the prior art HVELC have filters and most of the filters are not big enough to reduce the heat and the gases. A re-ignition is possible. Due to package conditions inside the junction box assembly 100 or elsewhere in the battery, bigger filters are not an option. Usually the prior art HVELC were fixed on top of the junction box. The idea disclosed here in the present invention is to use the space of the chamber external of the box adjacent the exterior surfaces underneath the HVELC for cooling the gas and avoid the re-ignition. This requires only channels 122 or at least 1 channel per stanchion 105 to route the hot gas from the HVELC into the chamber 120. If there are no suitable volumes in the stanchions 105 then the exhaust gas streams can be routed directly into the large left hollow chamber 120L and the large right hollow chamber 120R (FIG. 2A), if both chambers are separated by a wall 103. The present invention uses an existing part, junction box assembly 100, for exhaust gas and debris. Filtering is optional as no extra part for filtering is required, but can be provided as shown in FIG. 4.

Insert openings 122 in stanchions 105, which are aligned with the gas exit ports from HVELC prevent the ionized gases leaving the exit port and join around the line cutter, which could result in light arc re-ignition.

An electric line cutter device 10 for high voltage busbars 2 is illustrated in FIGS. 5-8. The device 10 has an upper housing 12 and a lower housing 14. Sandwiched between the upper 12 and lower housing 14 is a busbar 2. The busbar 2 is designed to carry high voltage currents and can be used as a means for carrying power from a battery system to the various components of a vehicle as way of example.

Figure 5:
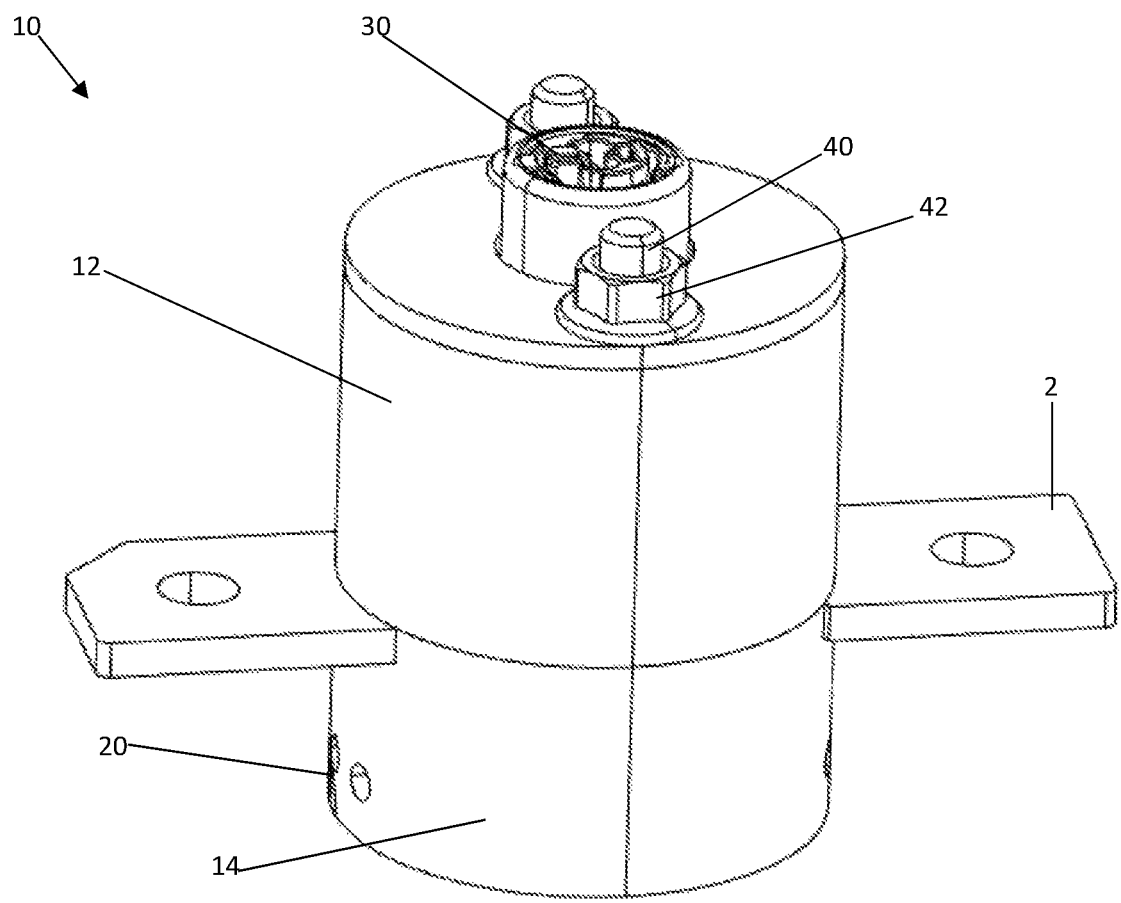
FIG. 5 is a frontal perspective view of the electric line cutter device of the present invention.
Figure 6:
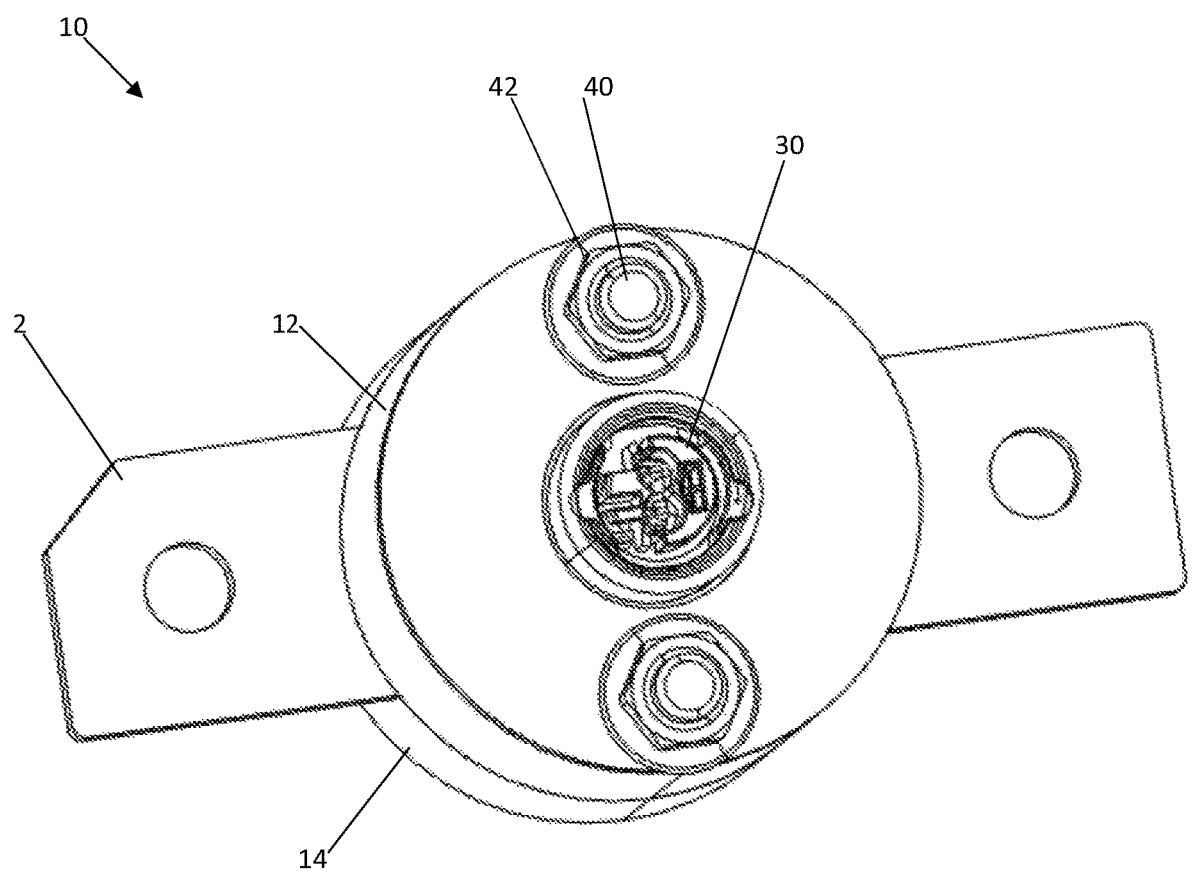
FIG. 6 is a top perspective view of the device of FIG. 5.

Shown at a top portion of the device 10 are electrical connections for an igniter 30. As illustrated in FIG. 5, the two housing parts 12, 14 are held together by fasteners 40 when tightened by threaded nuts 42. This is also illustrated in the cross-sectional view of FIG. 7.

Figure 7:
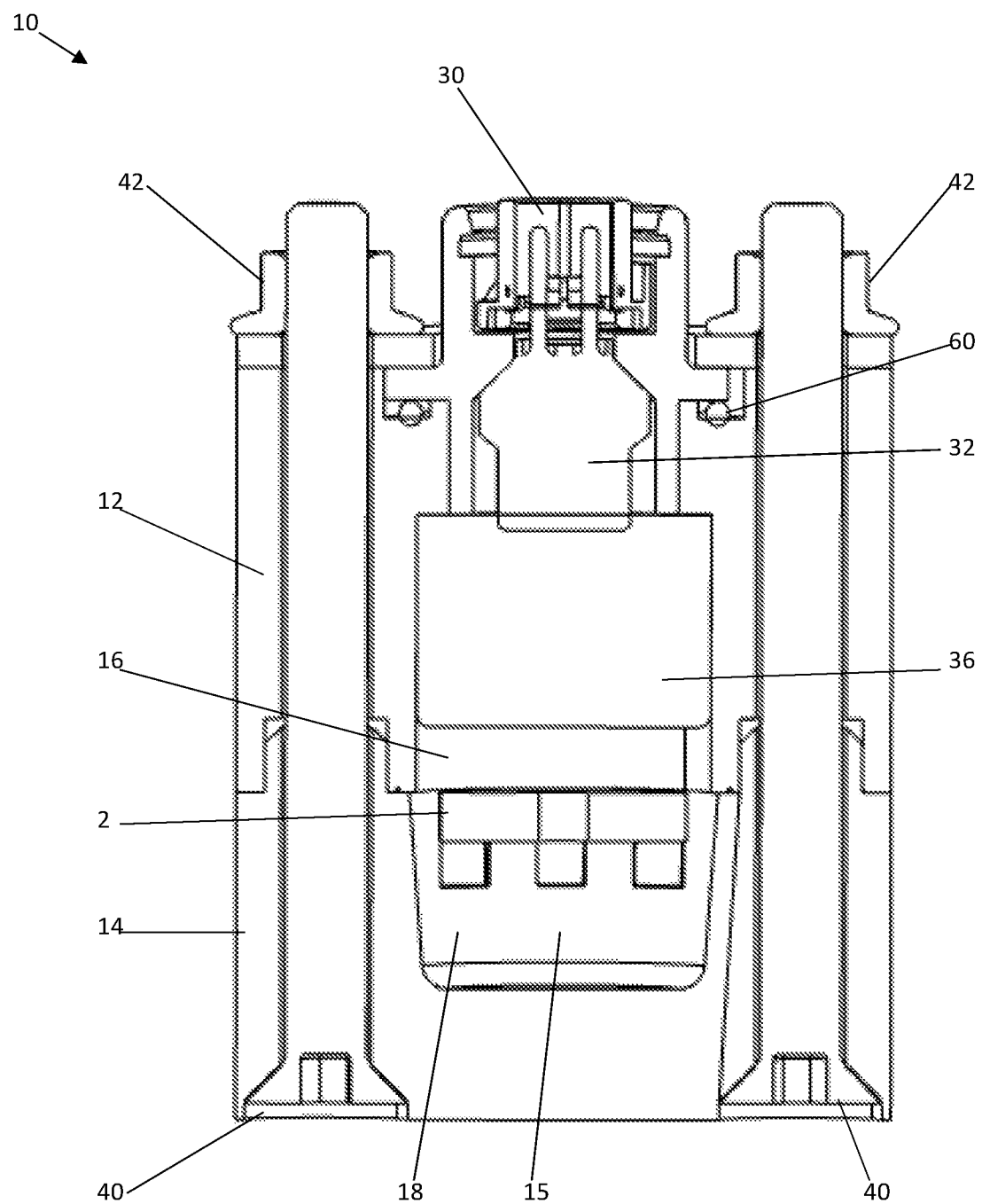
FIG. 7 is a first cross-sectional view of the device of FIG. 5 showing the attachment fasteners.

With reference to FIG. 7, the fasteners 40 when engaging the nut 42 extend through the lower housing 14 and upper housing 12 and when tightened clamp tightly about the busbar 2. As shown, the igniter 30 is positioned on an O-ring seal 60 and further includes a squib 32 with propellant. This forms a pyrotechnic device that is capable to propel a piston 36 contained within chambers 16, 18. As shown in FIG. 3, the piston 36 is contained in chamber 16 of the upper housing 12. The chamber 18 the lower housing 14 is shown with a slight inward taper 15, as illustrated in FIG. 7. When the igniter 30 is activated by an electronic signal sent from a vehicle crash detection system 50 such as an Airbag Electronic Control Unit/Airbag ECU", if an airbag sensor doesn't exist, then it's a crash sensor/acceleration sensor, the squib 32 fires the propellant and propels the piston 36 toward the busbar 2. If there is a fire in the vehicle, the busbar can be cut when the cutter gets a defined signal. A pyrotechnical actuator separates electric high voltage battery connection in an electric vehicle irreversibly from the drive train. It is triggered by the Airbag ECU in case of a crash to prevent electric shock hazards or fires due to overcharge of battery or short circuits within the system. The ignitor 30 receives a certain current of for example, 1.75 A for a certain time, such as 500 msec.

Figure 9A:
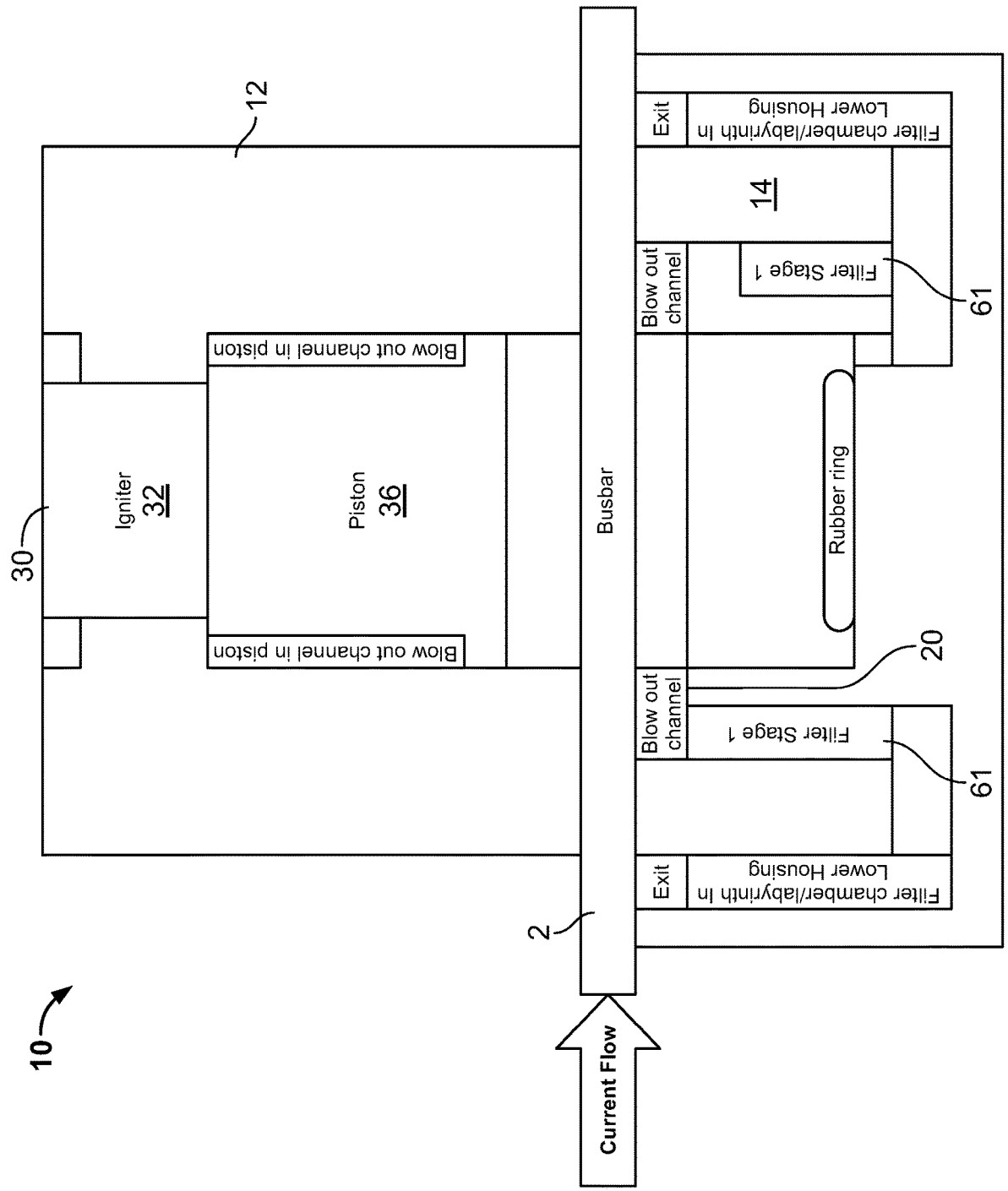
FIG. 9A is a schematic view of the device showing the busbar in closed mode allowing current flow.
Figure 9B:
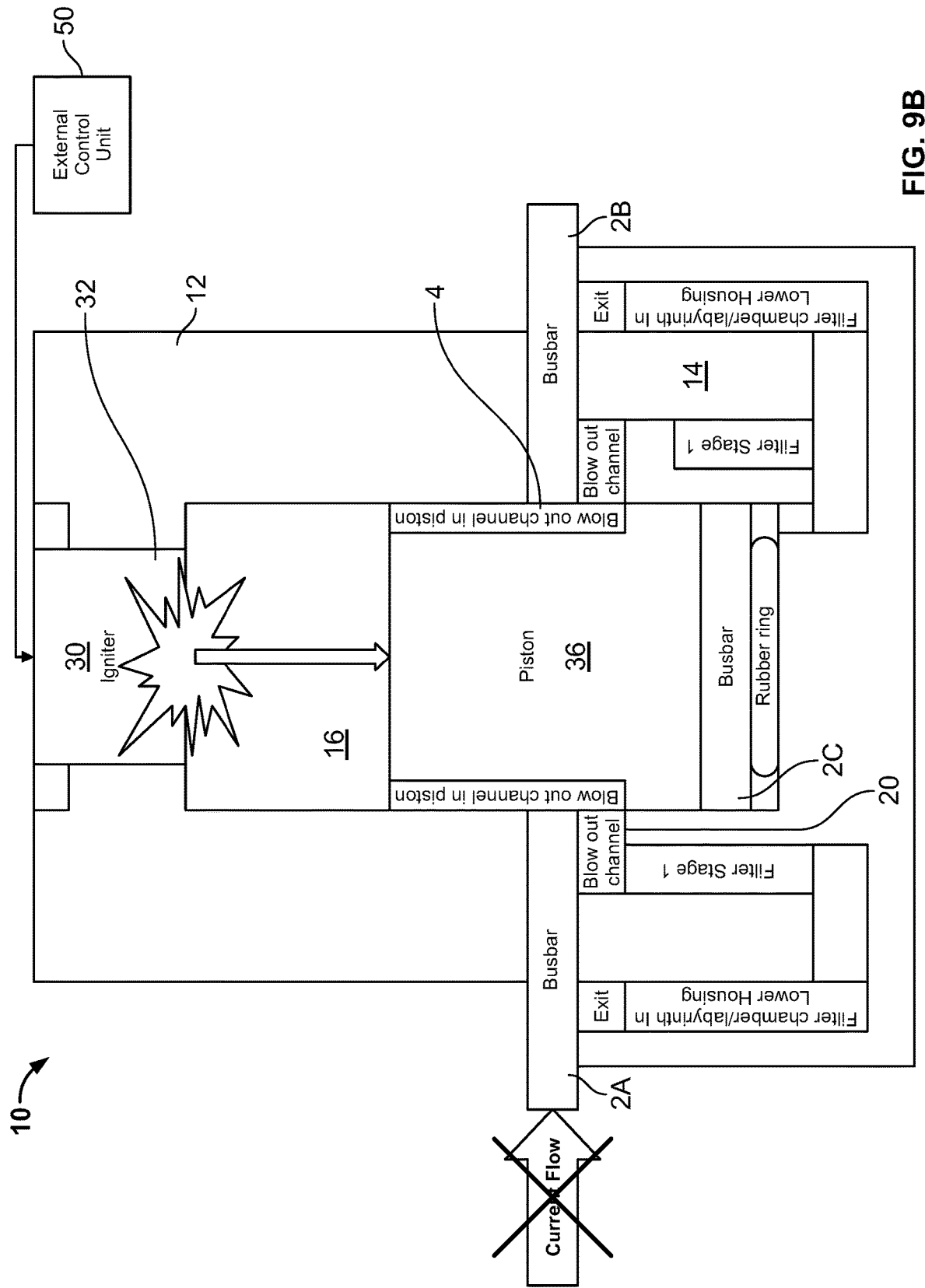
FIG. 9B is a schematic view of the device showing the busbar in open mode disrupting current flow.

The busbar 2, as illustrated in FIG. 8, has a pair of fracture locations 4 on each side of the busbar 2. These fracture locations 4 are reduced thickness sections of the busbar 2 capable of carrying the current, but providing a means of fracturing the busbar 2 parts thereby disrupting the current flow, best illustrated in FIG. 9B. Under normal operating conditions, the busbar 2 is a continuous piece, however, during a vehicle crash, the igniter 30 receives a specific signal from a crash detection system 50 or from another control unit such as the safety computer or airbag ECU, preferably an airbag crash detection system and is activated. When this occurs, the piston 36 is driven downward into the chamber 18 as will be discussed later. During this fracturing of the busbar 2 and disruption of the current, arcs can occur. These arcs create discharges and gas discharges inside the electric cutter device 10, as such these gases can be dispelled through passages 20 that create open vent passages to allow the gas to discharge. The piston 36 is made of non-conductive material, typically plastic or ceramic. The piston 36 has several functions: Transformation of the gas pressure from the igniter 30 into kinetic energy of the piston 36; Cutting of the busbar and surrounding electrical insulation thereby separating the two busbar stub ends 2A, 2B after cutting; Division of the current into two separate current flows and electric arcs; Extension of the arcs by moving the cut-out busbar part 2C away from the powered stub ends 2A, 2B.

The object of the present invention is to be able to switch off very high currents up to 16 kA and voltages up to 1000 V in a very small space in a very short time <2 msec.

The task is solved by a galvanic separation of a busbar 2 using a pyrotechnic device such as the igniter 30, including a squib 32, and the piston 36 and by extinguishing the electric arc using simultaneously several methods which include simultaneous cooling by venting and filtering hot gases and squeezing any gaps that can arc by passing the piston 36 into a chamber.

The busbar 2 which is mounted between high voltage battery and the power consumption devices is embedded in an upper housing 12 and lower housing 14 made of insulation material. The high voltage-electric line cutter (HV-ELC) device 10 in closed mode allows current flow over the busbar 2 with very low resistance. In the case of a short circuit in the high voltage, HV, system of the vehicle, an external control unit 50 ignites a pyrotechnic propulsion unit in the upper housing 12 of the HV-ELC, which then accelerates an insulating piston 36 downwards. The piston 36 separates a part 2C of the busbar 2 at fracture locations 4 and moves between the two busbar stub ends 2A, 2B so that the current flow is interrupted.

The HV-ELC device 10 consists essentially of a busbar 2, a pyrotechnic igniter 30, an insulating piston 36, an upper housing 12, a lower housing 14 and an optional filter system.

The busbar 2 is designed in such a way that in normal operating mode it conducts the current of the high-voltage system in the vehicle from the high-voltage battery to the HV consumers with a minimum resistance. The main function of the HV-ELC device 10 is the rapid interruption of this circuit after external trigger within less than 2 msec. For this purpose, the pyrotechnic igniter 30 is installed in the upper housing 12 of the HV-ELC device 10. The igniter 30 is connected to an external airbag electronic control unit 50 which, in an emergency case, sends a defined ignition signal to the igniter 30. The low-voltage ignition circuit is separated from the high-voltage circuit by the insulating housing of the device 10. The current of the ignition signal melts a wire in the igniter 30, causing a propellant stored in a squib 32 to be ignited in about 0.2-0.6 msec. The propellant can expand into a chamber or space 16 under the igniter 30. A movable piston 36 is mounted directly under the igniter 30. The piston is accelerated downwards by the pressure of the hot gases. The busbar 2 has a reduced cross-section in two places for easier cutting called fracture locations 4. As soon as the accelerated piston 36 impacts on this busbar 2 at this section, it separates this fractured part 2C and pushes it further downwards. At high levels of current, the current continues to flow through an electric arc despite the fact that a part of the busbar 2 has been disconnected. The arc must be extinguished as soon as possible, by extending, cooling and/or squeezing the arc.

The HV-ELC device 10 uses several of these methods. The insulating piston 36 slides between the two busbar stub ends 2A, 2B and thereby moves the center busbar part 2C away from the stub ends 2A, 2B. The arc is lengthened. Due to the tight fit of piston 36 and cylinder chamber 18, the arc is "squeezed" down to a small gap. In the piston 36 and in the outer walls of the chamber 18 directly under the busbar 2C, gas channels 20 for the hot gas are provided as "blow channels". The highly compressed pyrotechnic gas above the piston 36 flows into the exhaust channels 20 laterally under the busbar 2, after cutting the busbar 2 and passing the piston 36 blow channel area. Since the arc is burning in this area, the arc is "blown" by the gas into the blow channels 20 too. As a result of this lengthening and cooling of the arc, the voltage increases further until the arc is extinguished. Additionally, the highly compressed pyrotechnical gas from the igniter and the metal filter reduce the ionization.

The gas channels 20 in the lower chamber 18 can lead to an optional filter area (the exhaust shell or filter shell) which can be labyrinth-like with at least one chamber with pressure compensation, cooling, deionization and filter functions. The first chamber should be filled with a metal filter for deionization and cooling of the arc. The further chamber(s), see FIG. 12A with 2 chambers and 12B with 3 chambers, can be filled with filter material or cooling material, so that as much energy as possible is extracted from the gas/plasma e.g. by means of electric sublimation upon initiation of the very hot gases (plasma from the arc). The sublimation energy also includes the melting heat in addition to the evaporation energy.

The labyrinth with many deflections also slows down heavy particles by impact on the walls and filters it out before the gas escapes. In particular, evaporated copper is to be precipitated from the busbar on the walls, and not completely combusted hot particles of the propellant are slowed down here so that they are completely combusted within the filter. The filter labyrinth with many deflections also serves to slow down heavy particles by impact on the walls and to filter it out before the gas escapes from the outlet. In particular, evaporated copper is to be precipitated from the busbar on the walls, and not completely combusted particles of the propellant are slowed down here so that they are completely combusted within the filter.

Figure 10:
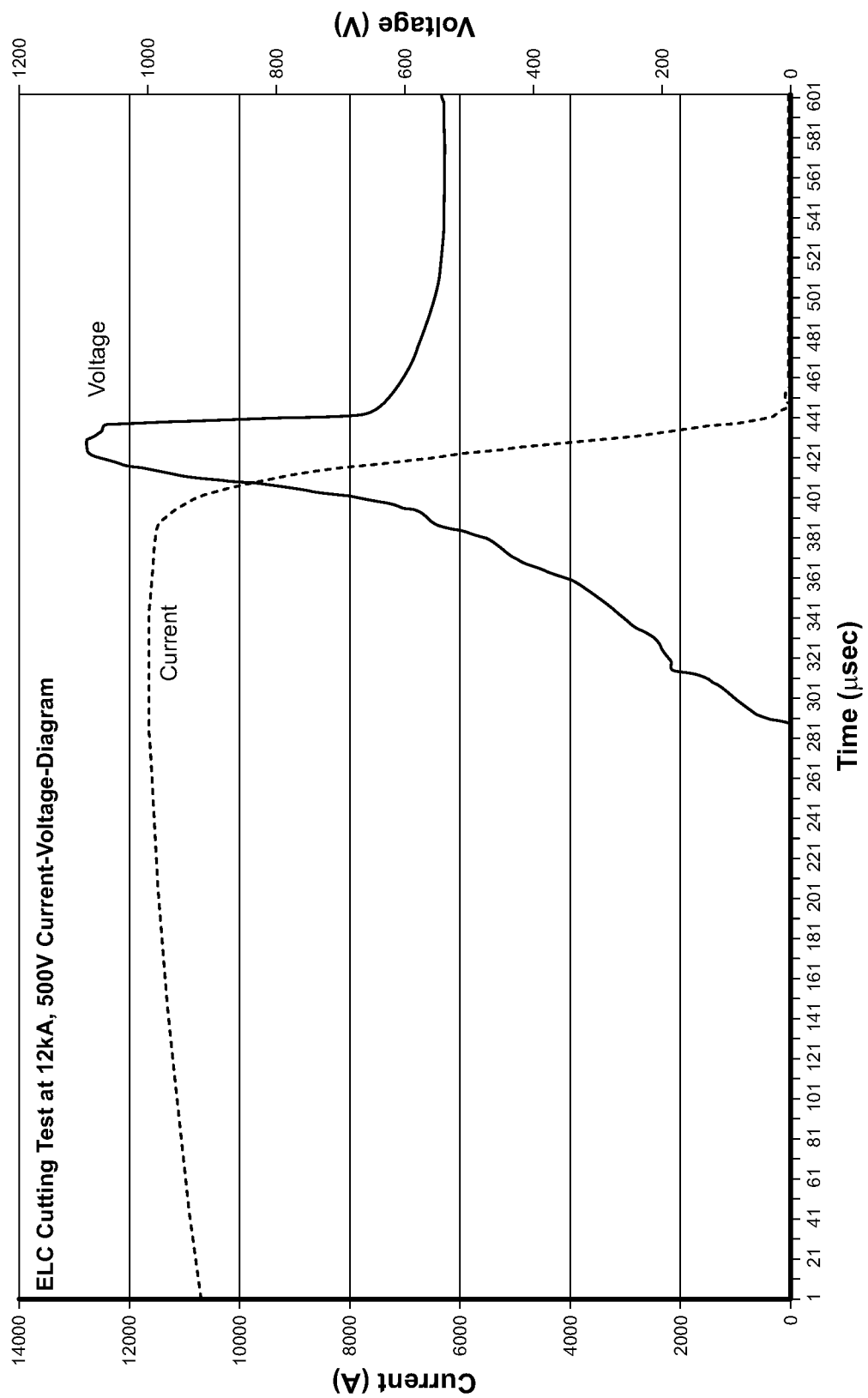
FIG. 10 is a diagram showing the cutting process with voltage and current over time after activation of the device.

The object, as already discussed, of the present invention is to be able to switch off very high currents up to 16 kA and voltages up to 1000 V in a very small space in a very short time <2 msec, as shown in FIG. 10.

The task is solved by a galvanic separation of a busbar 2 using a pyrotechnic device 30, 32, 36 and by extinguishing the electric arc using simultaneously several methods: extension of the arc with simultaneous cooling and squeezing.

Integrated "blow channels" 20 in the housing and piston support the "blow out" or "blow away" of the electric arc. For this purpose, channels are added in the piston laterally across the width of the busbar, which directs the pyrotechnic gas stream. As soon as the piston 36 has cut the busbar 2 and has reached the exhaust channels 20 below, the emerging electric arc can be blown into the gas outlet channels 20 via the blow channels in the piston. A "squeezing" function for the arc allows a faster arc interruption. The shape of the piston 36 can have different profiles. Different variants of the piston 36 have been tested: one has a round shape without cutting edge, another has a rectangular shape with metal cutting edge. Optional integration of metal arcing plates (not shown) can be placed into the cylinder chamber 18 in the area of the outlet ducts. As well integrated channels inside the piston are considerable to guide the gas from the igniter to the arc plasma right after cutting the busbar.

Figure 13:
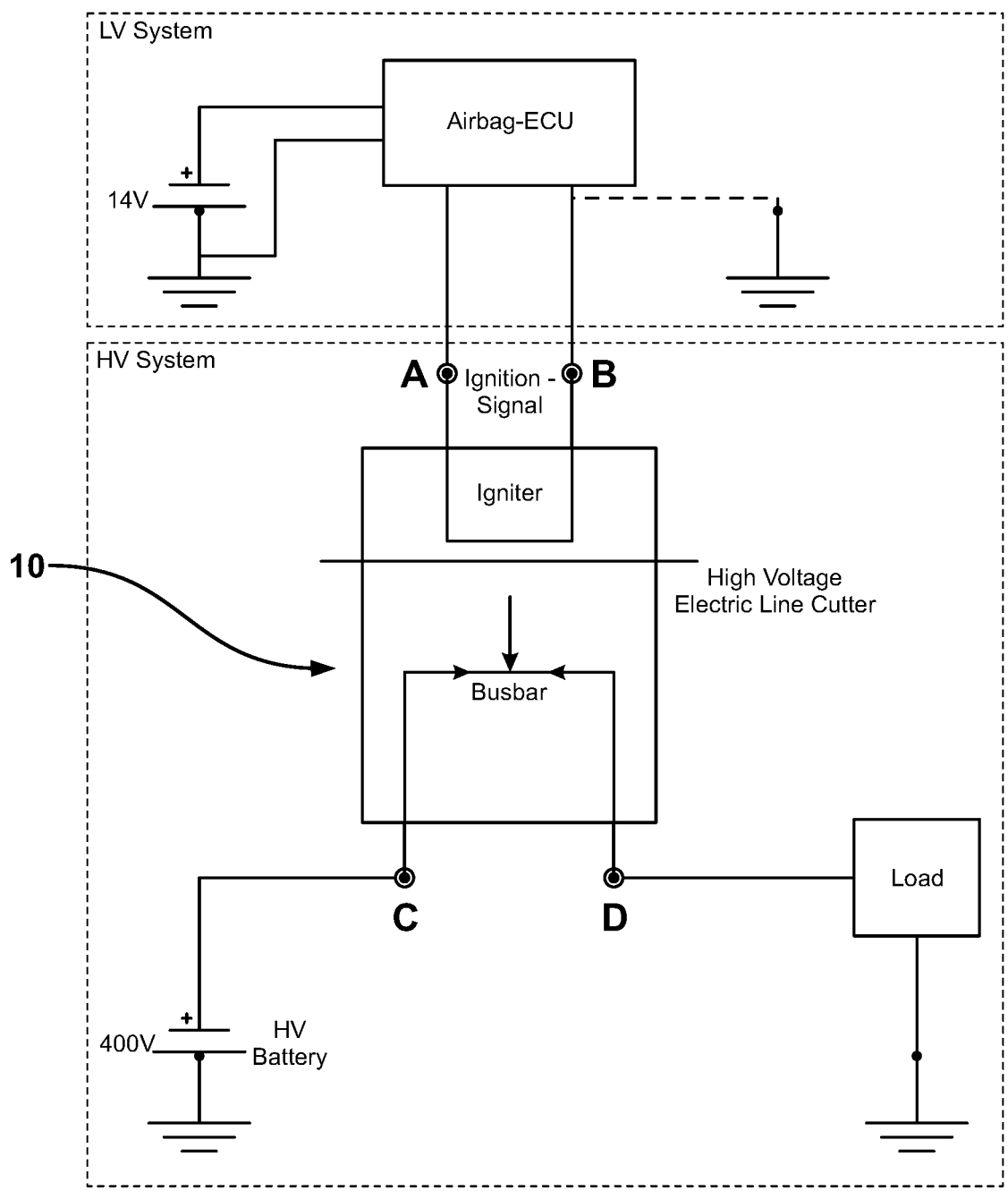
FIG. 13 is an exemplary schematic electric circuit diagram of the device embedded in a vehicle environment.

The piston 36, preferably has an optimized edge profile at the lower end for the efficient cutting of a part of the busbar 2. The piston 36 on the lower side can have cutting edges (not shown). This is to facilitate the cutting of the busbar 2. The cutting edges of the piston 36 can be of both plastic and metal. The cutting edges of the piston have a special cutting profile with which it is possible to influence the arc shape and separation, by way of example inverted V-shape with first cutting at the sides and final cutting in the middle of the rail, FIG. 13. The piston 36 has one or more "blowing channels" through which gases can be conducted. The blowing channels can branch and combine. The inlet cross-section and outlet cross-section may be different. The piston 36 at the lower end has a region which lies flush against the lower chamber 18 or cylinder wall and can thus squeeze, hinder or block the electric arc in a "squish area". The piston 36 after ignition is guided in a chamber 16 in the upper housing 12 and then in a chamber 18 in the lower housing 14. The piston 36 can have guide grooves or guide bars or any other guiding profile for the purpose of preventing the twisting or tilting and securing of a correct mounting with the corresponding counter profile for this being in the cylinder, cuboid or prism (not shown).

Figure 15A:
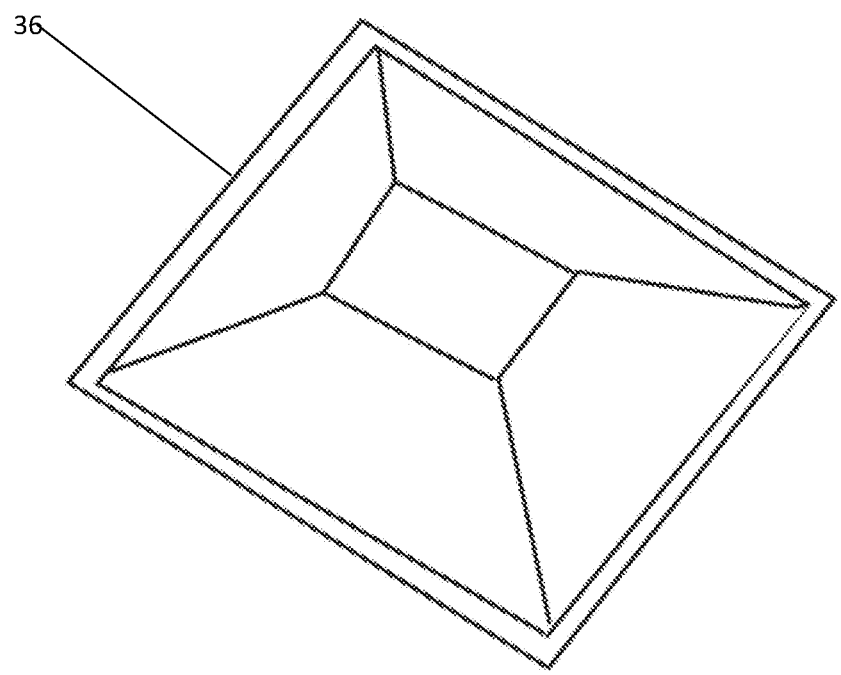
FIG. 15A is an isometric view and 15B is a plan view that diagrammatically illustrate a pyramidal/prism shaped piston with the chamber.
Figure 15B:
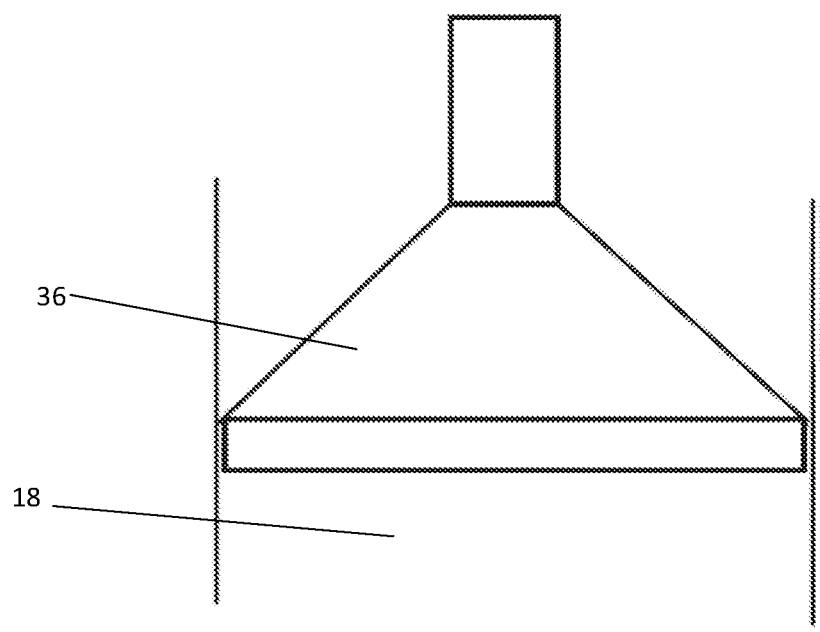

The upper and lower cylinder, cuboid or prism chambers 16, 18 can have a guide groove or a guide web or any other guiding profile which corresponds to the piston 36. FIGS. 15A and 15B show the pyramid/prism shaped piston 36. The piston 36 is securely held in the uppermost position until the ignition is triggered, for example a latching lug or a detent projection, FIGS. 8 and 9A.

Figure 14:
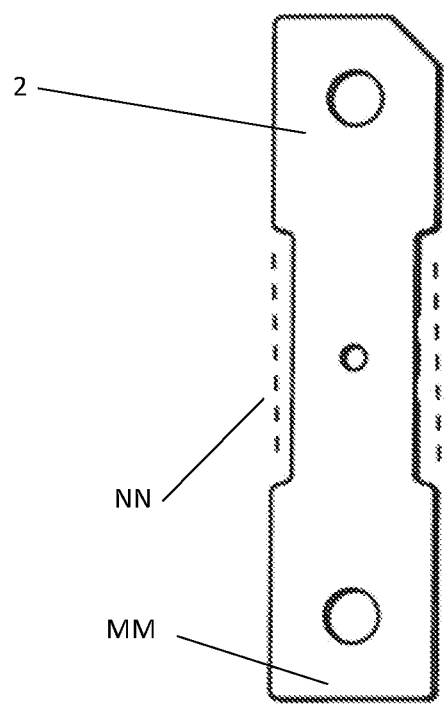
FIG. 14 is a plan view of the busbar with a preferred shape of the busbar being generally rectangular with a narrowed center. The phantom lines NN illustrate that the center of the busbar can be as wide as its opposite ends MM.

FIG. 14 shows a plan view of the busbar with a preferred shape of the busbar being generally rectangular with a narrowed center. The phantom lines NN illustrate that the center of the busbar can be as wide as its opposite ends MM.

Figure 11:
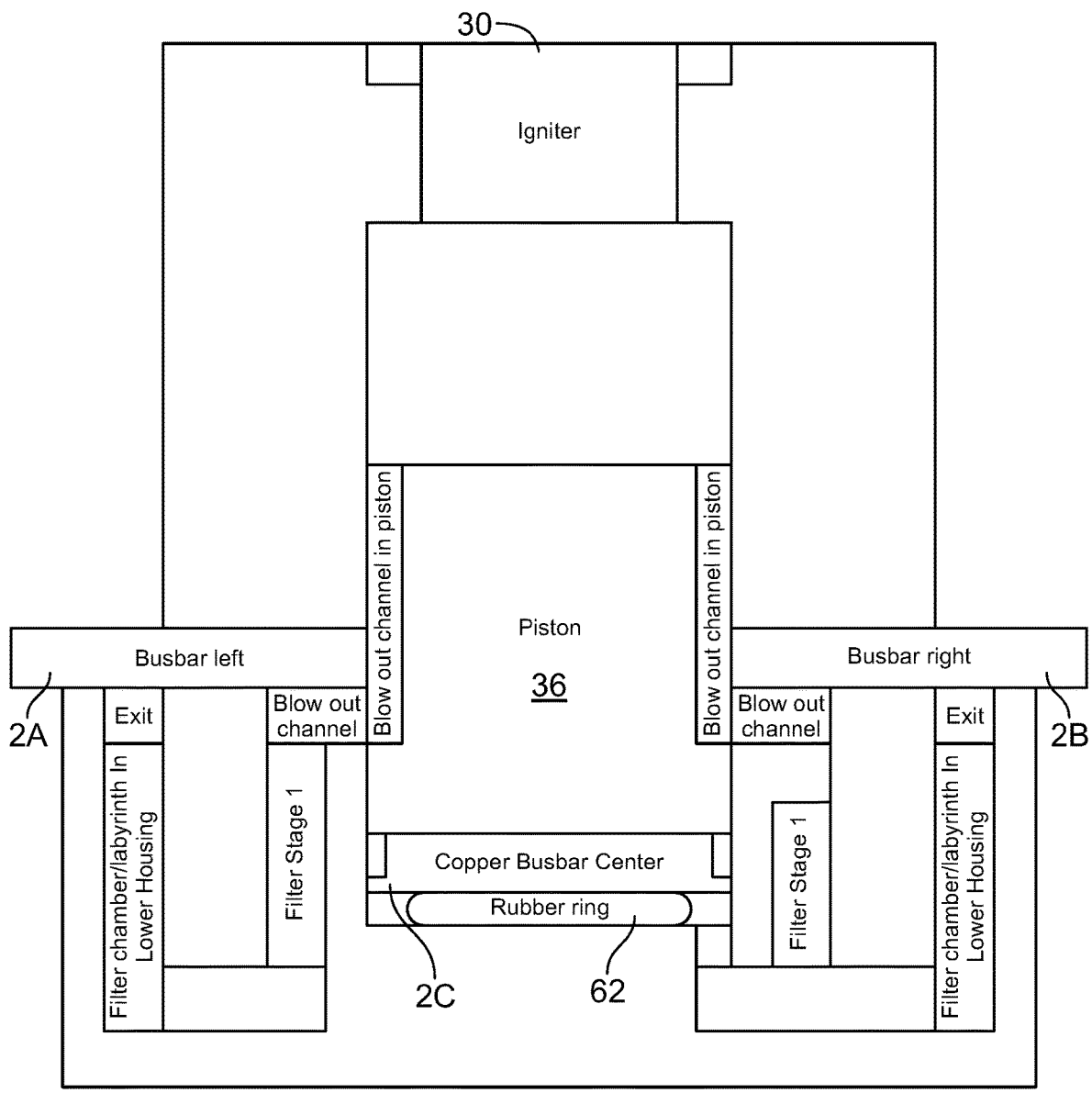
FIG. 11 is a view of the device showing the busbar in the open mode.

The lower cylinder, cuboid or prism chamber 18 of the lower housing 14 has a shape or additional profile for decelerating the piston 36. This deceleration can be created by a conical cross-section, narrowed down to a taper 15 shown in FIGS. 3 and 4; embedded braking struts with progressive braking effect by constriction; and/or integrated deformable profiles or ribs in the lower region of the chamber 18 capable of absorbing the kinetic energy of the piston 36. As shown in FIG. 11, additional deceleration elements on the cylinder bottom, for example in the form of a rubber ring 62, could be used.

The piston 36 can have a device with which it can be securely held in the lower end position—after triggering the ignition, cutting the busbar 2 and reaching the lower end position, for example a latching lug or a detent projection. The locking profile can also consist of the above-mentioned progressive braking struts, which have a detent projection below which the piston snaps into.

The chamber 18 has a device with which the piston 36 can be securely held in the lower position, for example, the tapered or narrowed down profile into which the piston snaps after triggering the ignition, cutting the busbar 2 and reaching the lower end position.

The lower chamber optionally has one or more relief bores or vent passages, via which the gas compressed during the downward movement of the piston 36 can flow out into the filter region 61 or outwards which is designed or narrowed in such a way that the compressed gas under the piston 36 is used for deceleration and/or impact damping.

The length of the lower chamber 18 is designed to be sufficient to interrupt the electric arc and to decelerate the piston 36.

The position and profile of the outlet channels 20 or vent passages are designed in such a way that the arc can be "blown away" to the outside. This is usually done on both sides directly under the busbar across the width of the busbar 2. The outlet channels 20 can be closed at the outer end, whereby the material of the wall must be so thin at the end that the wall breaks at increased pressure. The outlet channels 20 in the lower chamber 18 can also be filled with filters 61 made of a material, preferably made of metal, shown in FIG. 9A. The outlet channels 20 ducts can lead the gas to an external auxiliary volume (filter shell) which can contain one or more filter stages.

The filter material 61 below the outlet channels 20 in the lower chamber 18 consists of metal structures with a large surface area so that the hot gases can be better cooled and deionized by the metal. This also improves the arc extinguishing. The density of the filter material 61 in the outlet channels 20 in the lower chamber 18 is chosen such that the gas pressure is decelerated in a slowed manner and the exiting gases can be cooled longer.

The lower chamber 18 can have one or more metal arcing plates inserted into the wall below the outlet openings.

Figure 12A:
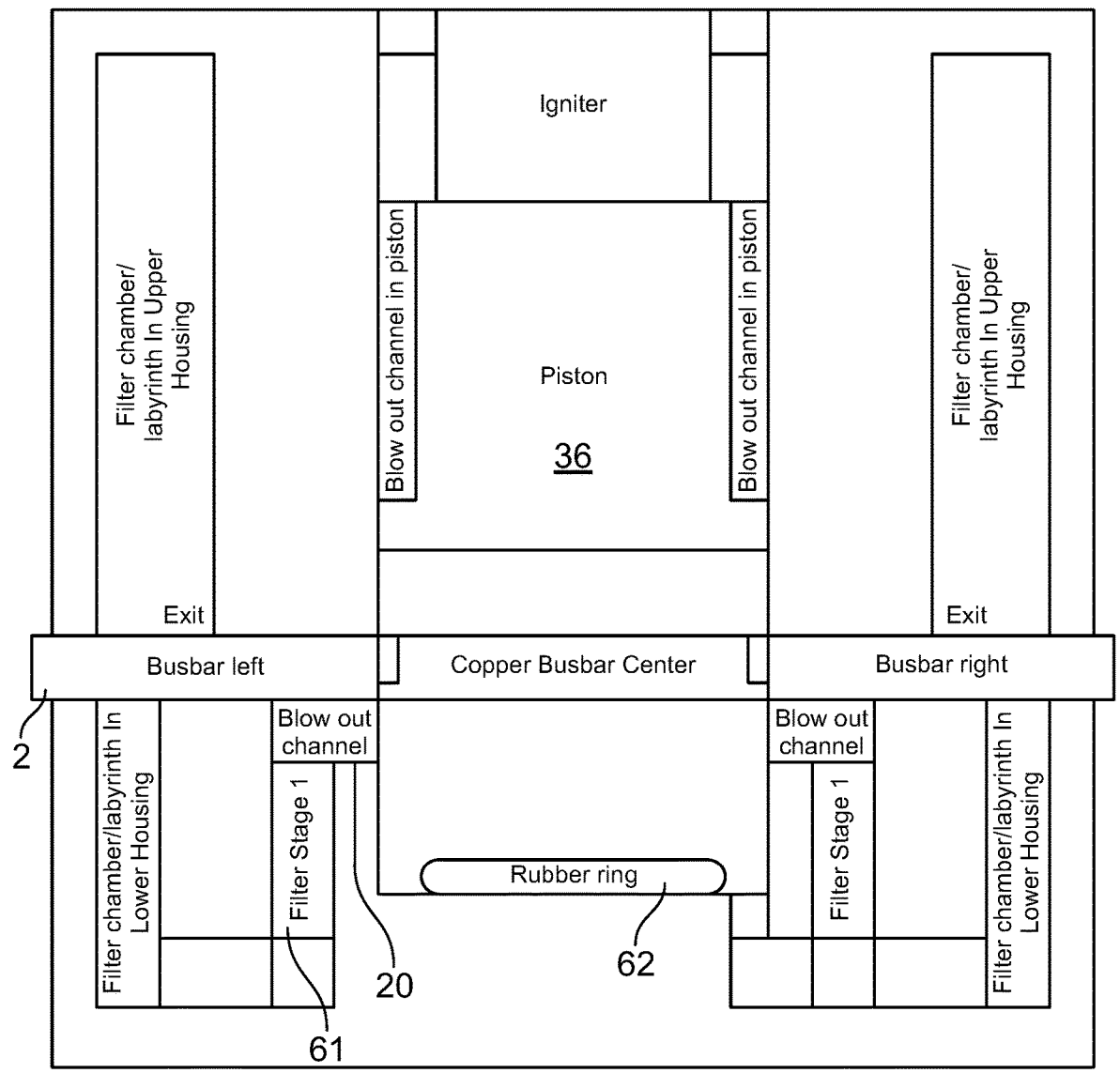
FIG. 12A is a view of the device showing the device with metal filter (filter stage 1) and a second filter stage in standard operation before activation. It is a functional representation for one exemplary use of the device as part of a vehicle crash system.
Figure 12B:
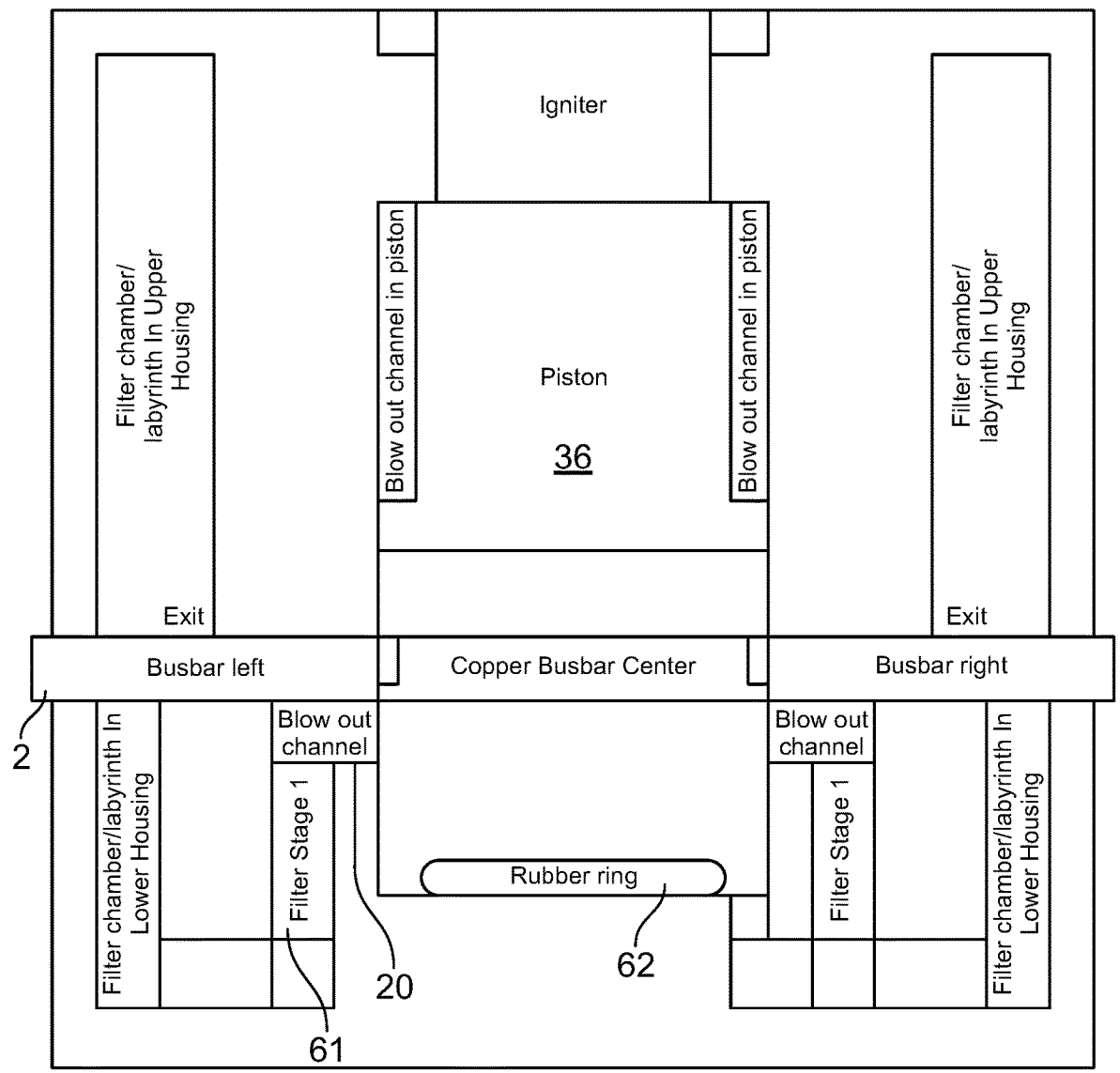
FIG. 12B is a view of the device showing the device with metal filter (filter stage 1) and a second filter stage in the lower housing and a third filter stage in the upper housing in standard operation before activation. It is a functional representation for one exemplary use of the device as part of a vehicle crash system.

The hot gases can be further filtered and cooled in extended filter areas, shown in FIG. 12A and FIG. 12B. The filter function can be divided into more than one chamber, FIGS. 12A, 12B. In particular, the two gas streams of the two busbar stub ends 2A, 2B have to be separated by a dividing wall. No gases from the one outlet channel may come together with gases from the other outlet channel within the housings 12, 14 because of the risk of reigniting the electric arc after extinguishing it.

The expansion and filtering volume(s) (exhaust shell or filter shell) for the hot gas can be integrated into the electric line cutter housing(s) or can be outsourced into an external auxiliary volume.

FIGS. 12A and 12B show examples for highly integrated filter solutions with 2 and with 3 stages. A lower filter area (filter pot) as a second filter stage surrounds the lower cylinder in a gas-tight manner, FIG. 12A. The filter area must have at least two separate chambers for the two gas streams. The gas streams of the first filter stage are introduced into the second filter stage via their outlet channels in the lower part of the lower housing. An upper and lower filter area (FIG. 12B, filter pot) surrounds the upper and lower cylinders in a gas-tight manner, both filter sections being connected to one another. Both filter areas must have at least two separate chambers for the two gas streams. An upper and lower filter area (filter pot) are connected to one another in such a way that the gases introduced into the lower filter area can also be transferred into the upper filter area without losses. The aim is to use the entire space for the filtration (filter labyrinth) which is not required for stability.

The chambers in the filter can be connected with each other with many deflections. Different filter materials can be used in the filter chambers for different pressures, temperatures and gas velocities. One or more filter compartments can be separated by thin walls, which are only opened by the pressure. The outlet ducts blow off the hot gases from the bottom or top at both sides of the current rail, respectively, directed towards the current rail. The aim is that possibly still present gaseous copper precipitates on the cool current rails and hot gases are further cooled.

By extending and increasing the size of the HV-ELC, it can be adapted to higher currents and voltages. As an alternative the electric line cutter size can be stay small by "outsourcing" the expansion and filter volumes to external auxiliary volumes. Thus, the high voltage electric cutting performance becomes modular and scalable. The cutting kernel with igniter, piston and housing can be designed for optimized cutting performance and stability and can be used for all applications. Depending on the required cutting performance, i.e. current, voltage and inductance, different energy is produced by the igniter and the electric arc. An appropriate filter solution (see also exhaust shell and filter shell) can be used for each energy level, either with internal filters only, with combined internal and external filters, or only with filters in external auxiliary volumes.

As previously mentioned, there are several measures for deceleration of the piston: Conical shape in the lower housing, which is narrowing down from 18.3 mm below busbar to 17.0 mm on the floor. Then the diameter at the piston edge is about 17.5 mm. This should be sufficient to clamp the piston after shooting. Rounded corners in the lower cylinder of the lower housing to reduce the notch effect during the hard impact of the piston. Brake knobs on the ground to dampen the impact of the piston, FIG. 11. These knobs should be designed in such a way that they remove as much kinetic energy from the piston as possible with deformation. They can be produced during injection molding of the lower housing.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An electric fuse box or junction box assembly comprising:
   a high voltage electric line cutter assembly;
   a fuse box or junction box housing connected to a plurality of electrical lines, the housing having a pair of mounting stanchions affixed to the high voltage electric line cutter assembly via a busbar having a pair of stub ends;
   wherein each mounting stanchion has an attachment platform attached to and supporting each of the stub ends of the busbar and an underlying chamber below the attachment platform configured to receive exhaust gases generated when the high voltage electric line cutter assembly is activated and the busbar is broken; and
   wherein the high voltage electric line cutter assembly has a pair of exhaust ports and when the high voltage electric line cutter assembly is attached to the stanchions, the exhaust ports align with an opening in each stanchion to allow exhaust gas from the high voltage electric line cutter assembly to enter the underlying chamber.

2. The assembly of claim 1 further comprising a pair of auxiliary gas expansion volumes.

3. The assembly of claim 1 wherein the underlying chamber has an open end opposite the attachment platform.

4. The assembly of claim 1 further comprises a cover to enclose the junction box housing.

5. The assembly of claim 1 wherein the high voltage electric line cutter assembly comprises:
   a first housing with a chamber;
   a second housing with a chamber, the second housing affixed to the first housing;
   a piston contained inside one of either the first housing chamber or the second housing chamber;
   an igniter for driving the piston from one chamber to the other chamber;
   wherein the busbar is rigidly held between the first and second housings and spans across said first and second housing chambers; and
   wherein upon igniting the igniter, the piston breaks a portion of the busbar moving the piston and the broken portion of the busbar from inside one of either the first housing chamber or the second housing chamber into the other of the first housing chamber or the second housing chamber thereby stopping the electric current flow.

6. The assembly of claim 5 wherein the piston is at least partially formed as an insulator to prevent electric discharge.

7. The assembly of claim 5 wherein the first and second housings are made at least partially non-electrically conductive.

8. The assembly of claim 5 wherein the first and second housings are removably attached to the other by one or more fasteners.

9. The assembly of claim 8 wherein the busbar is held rigidly by a compression force between the first and second housings and at the attachment to the pair of mounting stanchions.

10. The assembly of claim 9 wherein the busbar, when broken, remains rigidly held at the two opposed sides at the attachment to the mounting stanchions.

11. The assembly of claim 10 wherein the busbar further comprises a pair of fracture locations, each fracture location being internal and adjacent to the first and second housings and of a reduced thickness when viewed in a cross-section of the busbar, the fracture location configured to break upon an impact from the piston.

12. The assembly of claim 5 wherein the igniter is electrically activated in the event of a signal from an Electronic Control Unit (ECU).

13. The assembly of claim 12 wherein the high voltage electric line cutter assembly is configured to be used in a vehicle capable of generating high voltages.

14. The assembly of claim 13 wherein the high voltage electric line cutter assembly is activated by a signal from the Airbag Electronic Control Unit in the event of a vehicle crash.

15. The assembly of claim 5 wherein the igniter is a pyrotechnic device and further comprises a propellant charge squib.

16. The assembly of claim 1 further comprising one or more filters for cooling and deionization of a gas plasma from an arc and the ignitor and to capture debris generated by the ignitor and during the breaking of the busbar.

17. The assembly of claim 16 wherein the filter is made of a high temperature resistant material.

18. An electric fuse box or junction box assembly comprising:
   a high voltage electric line cutter assembly, the high voltage electric line cutter assembly comprising:
   a first housing with a chamber;
   a second housing with a cylinder, cuboid or prism chamber, the second housing affixed to the first housing;
   a piston contained inside one of the first housing chamber or the second housing chamber;
   an igniter for driving the piston from one chamber to the other chamber;
   wherein a busbar is rigidly held between the first and second housings and spans across said first and second housing chambers;
   wherein upon igniting the igniter, the piston breaks a portion of the busbar moving the piston and the broken portion of the busbar from inside one of either the first housing chamber or the second housing chamber into the other of the first housing chamber or the second housing chamber thereby stopping the electric current flow;
   a fuse box or junction box housing connected to a plurality of electrical lines, the fuse box or junction box housing having a pair of mounting stanchions affixed to the high voltage electric line cutter assembly via the busbar having a pair of stub ends;
   wherein each mounting stanchion has an attachment platform attached to and supporting each of the stub ends of the busbar and an underlying chamber below the attachment platform configured to receive exhaust gases generated when the high voltage electric line cutter assembly is activated and the busbar is broken; and
   wherein the high voltage electric line cutter assembly has a pair of exhaust ports and when the high voltage electric line cutter assembly is attached to the stanchions, the exhaust ports align with an opening in each stanchion to allow exhaust gas from the high voltage electric line cutter assembly to enter the underlying chamber.

* * * * *